United States Patent Office 3,155,652

Patented Nov. 3, 1964

1

2

3,155,652

2-ACYL-10-CARBAMOYLPIPERIDINOALKYL-PHENOTHIAZINES AND PROCESS

John W. Cusic, Skokie, and Henry William Sause, Deerfield, Ill., assignors to G. D. Searle & Co., Chicago, Ill., a corporation of Delaware No Drawing. Filed Sept. 4, 1958, Ser. No. 758,929
11 Claims. (Cl. 260—243)

This invention relates to 2-acyl-10-carbamoylpiperidinoalkylphenothiazines and a process for the manufacture thereof. More particularly, this invention relates to compounds of the formula

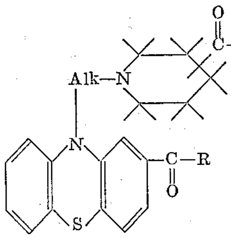

wherein R represents an alkyl radical; Alk represents an alkylene radical; and R′ and R″ represent—variously or alike—hydrogen or alkyl, alkenyl, or hydroxyalkyl radicals. Among the alkyl radicals comprehended by R in the foregoing formula, especially lower alkyl groupings are preferred. Examples of such radicals are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon radicals embracive of fewer than 9 carbon atoms arranged in chains, either straight or branched.

The alkylene radicals contemplated by Alk in the formula for compounds of this invention are bivalent saturated acyclic straight- or branched-chain hydrocarbon groupings of empirical formula $$C_nH_{2n}$$

wherein $n$ is a small positive integer greater than 1. Typical of these lower alkylene radicals are ethylene, 1,2-propylene, trimethylene, tetramethylene, and 2,2-dimethyl-1,3-propylene groupings.

The alkyl, alkenyl, and hydroxyalkyl radicals represented by R′ and R″ in the structural formula above, like the substituents R therein, are desirably composed of fewer than 9 carbon atoms and may be epitomized as lower alkyl groupings optionally modified to include a double bond or a hydroxy radical. Thus, in addition to the lower alkyl radicals hereinbefore illustrated, R′ and R″ are seen to designate vinyl, allyl, methylallyl, butenyl, hydroxyethyl, hydroxypropyl, dihydroxypropyl, (hydroxymethyl)propyl, hydroxybutyl, di(hydroxymethyl)-propyl, hydroxypentyl, and like lower alkenyl and hydroxy(lower alkyl) groupings. Those skilled in the art will appreciate that alkanoic acid esters and alkyl and alkenyl ethers corresponding to the described alcohols are also within the purview of the described invention; and as confirmed by the generic formula hereinbefore, the carbamoyl constituent wherein the various embodiments of R′ and R″ occur is positioned alpha, beta, or gamma to the piperidine nitrogen, ad libitum.

Equivalent to the basic amines of this invention for the purposes here disclosed are non-toxic addition and quaternary ammonium salts thereof, the compositions of which may be symbolized by

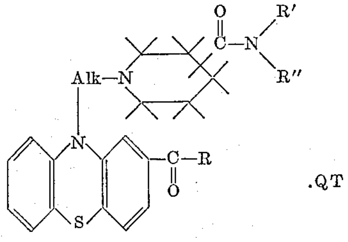

wherein R, Alk, R′, and R″ have the meanings hereinabove set forth; Q is selected from among hydrogen and lower alkyl, hydroxy(lower alkyl), and lower alkenyl radicals, as also such aralkyl radicals as benzyl, phenethyl, and naphthylmethyl; and T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Powerful and selective tranquilizing agents, the subject compositions thus unexpectedly differ from other, superficially-related aminophenothiazines disposed to depress the central nervous system. For example, 1-[3-(2-acetyl-10-phenothiazinyl)propyl]piperidine-4-carboxamide, a preferred embodiment of the invention, produces tranquillity in amounts 1/10 those necessary to obtain a commensurate response with the corresponding 2-chloro analog, and is relatively free of complicating side-effects.

The compounds herein disclosed are variously manufactured, but a preferred procedure comprises maintaining anhydrous contact for as long as several hours at elevated temperatures in an inert solvent between a 2-acyl-10-haloalkylphenothiazine of the formula

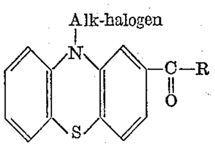

and a piperidine carboxamide of the formula

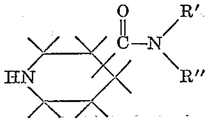

R, Alk, R′, and R″ having the meanings hereinbefore assigned. Suitable solvents are ethanol, butanone, toluene, dimethylformamide, and the like, a representative set of conditions for the contemplated preparations being 12 hours at reflux temperatures in butanone medium. An acid acceptor such as a tri(lower alkyl)amine or an alkali carbonate, hydroxide, or amide, and a catalyst such as sodium iodide may be incorporated in the reaction mixture if desired.

Conversion of the amine bases hereof to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with 1 equivalent of an organic ester of the formula

Q—T

Q and T being limited by the meanings hereinbefore assigned, and it being additionally provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade, pressures in millimeters of mercury, and relative amounts of materials in parts by weight, except as otherwise noted.

EXAMPLE 1

*1 - [3 - (2-acetyl-10-phenothiazinyl)propyl]-piperidine-4-carboxamide.*—To a solution of 32 parts of piperidine-4-carboxamide in 810 parts of butanone is added a solution of approximately 80 parts of 2-acetyl-10-(3-chloropropyl)phenothiazine in 200 parts of butanone, followed by a mixture of 35 parts of freshly-ground anhydrous potassium carbonate and 9 parts of sodium iodide washed in with 200 parts of butanone. The resultant mixture is heated at the boiling point of the solvent under reflux with agitation for 10½ hours, then cooled and filtered. The filtrate is stripped of solvent by distillation, and the residue is washed to neutrality with water and thereupon extracted with benzene. The benzene extract is dried over anhydrous potassium carbonate and then diluted with just sufficient ether to induce precipitation. The product thrown down is the desired 1-[3-(2-acetyl-10-phenothiazinyl)propyl]piperidine-4-carboxamide which, recrystallized from benzene, is obtained as a bright yellow crystalline powder melting at approximately 175–175.5°. The product has the formula

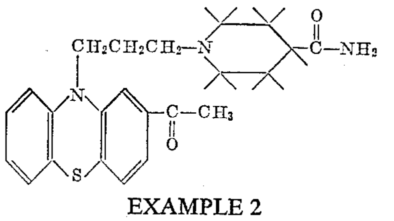

EXAMPLE 2

A. *10 - (3-chloropropyl)-2-propionylphenothiazine.*—A mixture of 220 parts of 2-propionylphenothiazine, 55 parts of 85% potassium hydroxide, 131 parts of 1-bromo-3-chloropropane, and 3200 parts of butanone is heated at the boiling point of the solvent under reflux with agitation for 3 hours. There is then introduced an additional 55 parts of 85% potassium hydroxide and 131 parts of 1-bromo-3-chloropropane, following which agitation at the boiling point under reflux is resumed for 5 hours. At this point, the reaction mixture is filtered and stripped of solvent by vacuum distillation. The residue is taken up in a mixture of xylene and ether; and the resultant solution is washed with water, then dried over anhydrous potassium carbonate, and finally distilled free of solvent. The product which remains is 10-(3-chloropropyl)-2-propionylphenothiazine.

B. *1 - [3-(2-propionyl-10-phenothiazinyl)propyl]piperidine-4-carboxamide.*—To 3200 parts of a 1:1 mixture of ethanol and butanone is added 113 parts of piperidine-4-carboxamide hydroacetate (prepared by intermixing equivalent quantities of piperidine-4-carboxamide and acetic acid), 130 parts of 10-(3-chloropropyl)-2-propionylphenothiazine, 30 parts of sodium iodide, and 200 parts of triethylamine. The resultant mixture is heated at the boiling point of the solvent present, with agitation, for 12 hours. It is then filtered, and the filtrate is stripped of solvent by distillation in vacuo. The residual oil is dissolved in chloroform; and the chloroform solution is washed thoroughly with dilute aqueous potassium hydroxide and then water, following which it is dried over anhydrous potassium carbonate and stripped of solvent by distillation. The residual oil is taken up in benzene, and the benzene solution is extracted with dilute hydrochloric acid. The acid extract is washed with ether and then made basic with dilute aqueous potassium hydroxide. The resultant mixture is extracted with chloroform; and the chloroform extract is washed with water, dried over anhydrous potassium carbonate, and stripped of solvent by distillation. The oily residue is dissolved in acetone, and the acetone solution is filtered to remove a small amount of insoluble material. Solvent is evaporated from the filtrate—residual moisture being removed by heating at 100° under 0.5 mm. pressure—and the residue is then taken up in a 1:1 mixture of ethyl acetate and benzene, and chromatographed on silica gel, using ethyl acetate and chloroform as developing solvents. From the chloroform eluates, on distillation of solvent and recrystallization of the residue from a mixture of benzene and mixed heptanes, there is obtained the desired 1-[3-(2-propionyl-10-phenothiazinyl)propyl]piperidine-4-carboxamide, in the form of yellow needles melting at 130–132°. The product has the formula

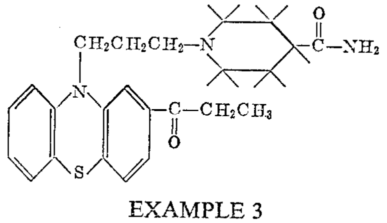

EXAMPLE 3

A. *Pyridine-2-carboxamide.*—A mixture of approximately 23 parts of ethyl pyridine-2-carboxylate, 24 parts of methanol, and 27 parts of concentrated ammonium hydroxide is let stand at room temperatures in a sealed vessel, then evaporated to dryness. Traces of moisture are removed from the residue azeotropically by distilling benzene therefrom. Crystallization from absolute ethanol affords pyridine-2-carboxamide melting in the range 100–110°.

B. *Piperidine-2-carboxamide.*—To a solution of 148 parts of pyridine-2-carboxamide in 790 parts of methanol and 250 parts of water is added 1 equivalent of hydrogen chloride dissolved in 150 parts of 2-propanol. There is then introduced 7 parts of platinum oxide, and the resultant mixture is agitated at substantially room temperatures with hydrogen under an initial pressure of approximately 42 pounds per square inch. When the uptake of gas indicates reduction is complete, the mixture is filtered; and the filtrate is made alkaline with potassium carbonate. The resultant material is evaporated to dryness, residual moisture being removed azeotropically by benzene distillation. The residue is triturated and extracted with acetone. The acetone extract is dried over anhydrous potassium carbonate and then stripped of solvent by distillation. There remains piperidine-2-carboxamide melting in the range 144–148°.

C. *1 - [3 - (2 - acetyl - 10 - phenothiazinyl)propyl]-piperidine-2-carboxamide.*—A mixture of 42 parts of piperidine-2-carboxamide, 96 parts of 2-acetyl-10-(3-chloropropyl)phenothiazine, 37 parts of triethylamine, 30 parts of sodium iodide, and 5000 parts of butanone is heated with agitation at the boiling point under reflux during 12 hours, then stripped of solvent by distillation and dissolved in chloroform. The chloroform extract is washed consecutively with dilute aqueous potassium hydroxide and water, and then thoroughly mixed with dilute hydrochloric acid, following which the chloroform phase is separated, consecutively washed with dilute aqueous base and water, dried over anhydrous potassium carbonate, and stripped of solvent by distillation, while the aqueous acid phase is washed with ether and made alkaline. The resultant alkaline material is extracted into chloroform; and this chloroform extract is washed with water, dried over anhydrous potassium carbonate, and stripped of solvent by distillation. The residues from the two chloroform extracts are each taken up in 800 parts of boiling benzene; and the two benzene extracts thus obtained are filtered, combined, and extracted with dilute hydrochloric acid. The acid extract, preliminarily washed with ether, is made basic; and the resultant mixture is extracted with benzene. This benzene extract is washed with water, dried over anhydrous potassium carbonate, and stripped of solvent by distillation to give a product which, recrystallized from a mixture of acetone and pentane, sinters at about 80° and melts at 95–99°. The powdery material so prepared is 1-[3-(2-acetyl-10-phenothiazinyl)propyl]piperidine-2-carboxamide, of the formula

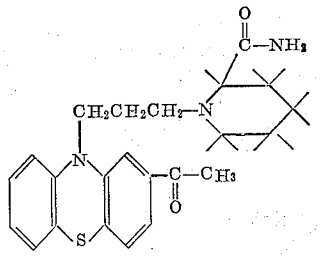

EXAMPLE 4

*1 - [3 - (2 - propionyl - 10 - phenothiazinyl)propyl]-piperidine-3-carboxamide.*—The substitution of 32 parts of piperidine-3-carboxamide and 83 parts of 10-(3-chloropropyl)-2-propionylphenothiazine for the 32 parts of piperidine-4-carboxamide and 80 parts of 2-acetyl-10-(3-chloropropyl)phenothiazine, respectively, called for in Example 1 hereinbefore affords, by the procedure there detailed, 1-[3-(2-propionyl-10-phenothiazinyl)propyl]piperidine-3-carboxamide, the formula of which is

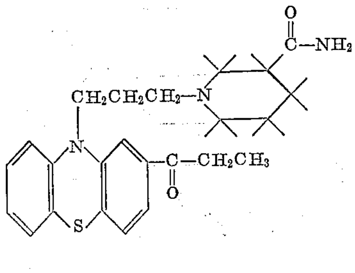

EXAMPLE 5

*1 - [3 - (2 - acetyl - 10 - phenothiazinyl)propyl]piperidine - 4 - (N - methyl)carboxamide hydrochloride.*—To a solution of 35 parts of piperidine-4-(N-methyl)carboxamide in 600 parts of butanone is added approximately 80 parts of 2-acetyl-10-(3-chloropropyl)phenothiazine dissolved in 400 parts of butanone, 35 parts of freshly-ground anhydrous potassium carbonate, and 9 parts of sodium iodide dissolved in 320 parts of butanone. (The use of finely divided carbonate improves the yield of product where butanone is the solvent.) The foregoing materials are mixed at the boiling point under reflux for 10½ hours, then cooled and filtered. The filtrate is stripped of solvent by evaporation; and the residue is washed to neutrality with water, following which it is taken up in benzene. The resultant solution is dried over anhydrous potassium carbonate, then diluted with ether and made acid with 1 equivalent of hydrogen chloride dissolved in 2-propanol. The hydrochloric acid salt thereupon precipitated is separated and dissolved in water. The aqueous solution, in turn, is washed with benzene and then made alkaline with aqueous caustic. The resultant mixture is extracted with benzene; and this benzene solution is washed to neutrality with water, dried over anhydrous potassium carbonate, and stripped of solvent by distillation. The residue, a yellow solid, is 1-[3-(2 - acetyl - 10 - phenothiazinyl)propyl]piperidine - 4 - (N-methyl)carboxamide, sintering at 60°, and melting at 78–81°. Upon dissolution of this base in benzene, incorporation of 1 equivalent of 2-propanolic hydrogen chloride, and dilution with anhydrous ether, there is precipitated the corresponding acid addition salt, the formula of which is

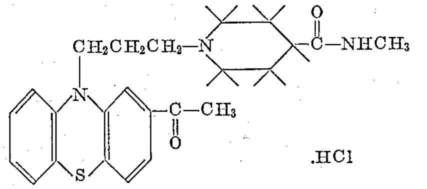

EXAMPLE 6

A. *10 - (β - chloroethyl) - 2 - [2′ - (2′ - methyl - 1′,3′-dioxolanyl)]phenothiazine.*—To a solution of 152 parts of 2-[2′-(2′-methyl-1′,3′-dioxolanyl)]phenothiazine in 2100 parts of anhydrous ether is added a 10% molar excess of butyllithium in 315 parts of anhydrous ether, following which there is introduced 141 parts of 2-chloroethyl p-toluenesulfonate. The resulting mixture is heated at the boiling point under reflux for 4 hours, then decomposed with water and consecutively washed with dilute hydrochloric acid, water, dilute aqueous potassium hydroxide, and water, in that order. The mixture is thereupon dried over anhydrous potassium carbonate and finally stripped of solvent by vacuum distillation. The product thus obtained is the desired ketal, namely, 10-(β-chloroethyl) - 2 - [2′ - (2′ - methyl - 1′,3′ - dioxolanyl)] phenothiazine.

B. *1 - [2 - (2 - acetyl - 10 - phenothiazinyl)ethyl]piperidine-3-(N-isopropyl)carboxamide.*—A mixture of 215 parts of the ethylene ketal of 2-acetyl-10-(β-chloroethyl)-phenothiazine described in the preceding Part A of this example, 98 parts of piperidine-3-(N-isopropyl)carboxamide, 40 parts of potassium hydroxide, 30 parts of sodium iodide, and 3500 parts of butanone is heated at the boiling point of the solvent present for 12 hours under reflux with agitation, whereupon the mixture is filtered and then stripped of solvent by vacuum distillation. The residue is taken up in benzene, and the benzene solution is washed first with dilute aqueous potassium hydroxide and thereafter several times with water. Upon distillation of solvent, there remains as the residue the desired 1-[2-(2-acetyl-10-phenothiazinyl)ethyl]piperidine-3-(N-isopropyl)carboxamide, of the formula

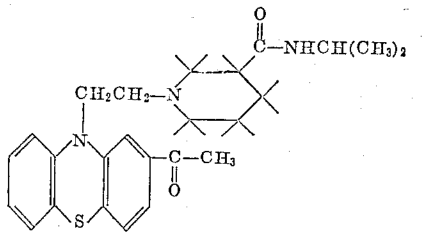

EXAMPLE 7

*1 - [3 - (2-acetyl-10-phenothiazinyl)propyl]piperidine-3-[N-(2-hydroxyethyl)carboxamide] hydrochloride.*—To a solution of 51 parts of piperidine-3-[N-(2-hydroxyethyl) carboxamide] in a mixture of 1200 parts of butanone and 20 parts of absolute alcohol at the boiling point under reflux is added, with agitation, 95 parts of 2-acetyl-10-(3-chloropropyl)phenothiazine dissolved in 400 parts of butanone, 15 parts of sodium iodide dissolved in 400 parts of butanone, and 42 parts of freshly-ground anhydrous potassium carbonate. The resultant mixture is maintained at the boiling point under reflux with agitation for 8 hours, then filtered and freed of solvent by evaporation. The residue is taken up in chloroform, and the chloroform solution is washed with water and then extracted with aqueous hydrogen chloride. The acid extract is washed with chloroform and then made alkaline, precipitating an oil. The oil is extracted into chloroform, and the resultant extract is washed with water, dried over anhydrous potassium carbonate, and stripped of solvent by evaporation. The foamy yellow solid which remains is taken up in butanone and the butanone solution, preliminarily washed with saturated aqueous sodium chloride, is extracted with dilute hydrochloric acid. The acid extract is brought to neutrality with base, washed thereat with butanone, and then precipitated with excess aqueous alkali. The precipitate is collected and dissolved in butanone, and this butanone solution is treated with decolorizing charcoal, dried over anhydrous potassium carbonate, and evaporated to give a brown gum, which is taken up in anhydrous ethanol. To the ethanol solution is added 1 equivalent of hydrogen chloride and sufficient anhydrous ether to induce precipitation. The precipitate is dissolved in water, and this aqueous solution is combined with an aqueous extract of the ethereal mother liquors. The resultant solution is made alkaline, and the precipitate which forms is taken up in chloroform. The chloroform solution is washed to neutrality with water, dried over anhydrous sodium sulfate, diluted with butanone, and freed of chloroform and residual moisture by azeotropic distillation. The butanone concentrate which remains is filtered, diluted with anhydrous ether to incipient cloudiness, and finally made acid with a slight excess of hydrogen chloride. More anhydrous ether is then added to complete precipitation of the yellow solid thrown down. The precipitated product, separated and dried in vacuo, sinters at 110° and melts in the range 110–115°. This material is 1-[3-(2-acetyl-10-phenothiazinyl)propyl]piperidine-3-[N-(2-hydroxyethyl)carboxamide] hydrochloride, the formula of which is

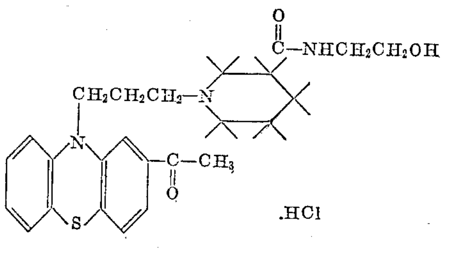

EXAMPLE 8

*1 - [3 - (2-acetyl-10-phenothiazinyl)propyl]piperidine-4 - [N - (2 - hydroxy-1-methylethyl)carboxamide] hydrochloride.*—Substitution of 55 parts of piperidine-4-[N-(2-hydroxy-1-methylethyl)carboxamide] for the 51 parts of piperidine-3-[N-(2-hydroxyethyl)carboxamide] called for in the foregoing Example 7 affords, by the procedure there detailed, 1-[3-(2-acetyl-10-phenothiazinyl)propyl]piperidine - 4 - [N-(2-hydroxy-1-methylethyl)carboxamide] hydrochloride, the formula of which is

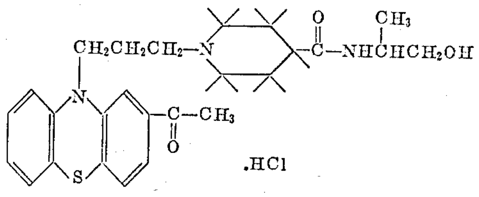

EXAMPLE 9

A. *2-butyryl-10-(3-chloropropyl)phenothiazine.*—Using the procedure of Example 2A, but substituting an equivalent quantity of 2-butyrylphenothiazine for the 2-propionylphenothiazine called for therein, one obtains 2-butyryl-10-(3-chloropropyl)phenothiazine.

B. *Pyridine-4-(N,N-diethyl)carboxamide.*—A mixture of 25 parts of methyl pyridine-4-carboxylate and approximately 28 parts of diethylamine is heated in a bomb at 120° for 8 hours. The product is taken up in methanol and the methanol solution freed of solvent by distillation. The residue, a hygroscopic solid, is pyridine-4-(N,N-diethyl)carboxamide.

C. *Piperidine-4-(N,N-diethyl)carboxamide.*—Approximately 15 parts of the pyridinecarboxamide of the preceding Part B of this example is dissolved in 100 parts of water, following which 15 parts of a 25% solution of hydrogen chloride in 2-propanol is introduced, and the resulting mixture is hydrogenated over a platinum oxide catalyst. The mixture is then filtered and the filtrate is mixed with a small amount of silver oxide to destroy hydrochloric acid. Filtration and removal of solvent by distillation leaves the desired piperidine-4-(N,N-diethyl) carboxamide as the residue.

D. *1 - [3 - (2-butyryl-10-phenothiazinyl)propyl]piperidine-4-(N,N-diethyl)carboxamide.*—To a solution of approximately 6 parts of piperidine-4-(N,N-diethyl)carboxamide, 1 part of sodium iodide, and 4 parts of anhydrous potassium carbonate in 40 parts of butanone is added, with agitation, approximately 10 parts of 2-butyryl-10-(3-chloropropyl)phenothiazine dissolved in 40 parts of butanone. Heating and agitation are continued during 12 hours, at which point the reaction mixture is cooled and filtered. Upon removal of solvent from the filtrate by vacuum distillation, there is obtained as a residue the desired 1 - [3-(2-butyryl-10-phenothiazinyl)propyl]piperidine-4-(N,N-diethyl)carboxamide, of the formula

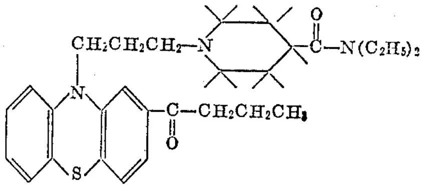

What is claimed is:

1. A compound of the formula

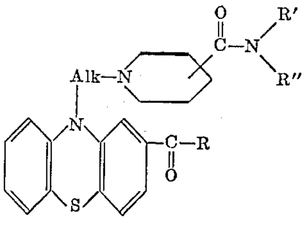

wherein R is lower alkyl; Alk is lower alkylene containing more than 1 carbon atom and separating the nitrogen atoms attached thereto by at least 2 carbon atoms; and R′ and R″ are selected from the group consisting of hydrogen, lower alkyl, and hydroxy(lower alkyl).

2. A compound of the formula

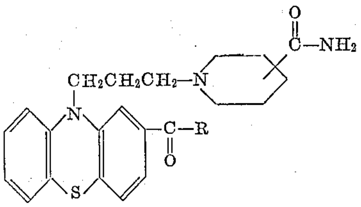

wherein R is lower alkyl.

3. 1 - [3-(2-propionyl-10-phenothiazinyl)propyl]piperidine-4-carboxamide.

4. A compound of the formula

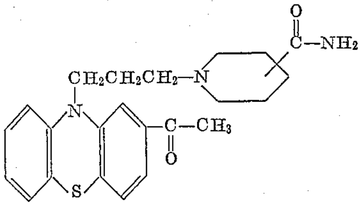

5. 1 - [3-(2-acetyl-10-phenothiazinyl)propyl]piperidine-4-carboxamide.

6. 1 - [3-(2-acetyl-10-phenothiazinyl)propyl]piperidine-2-carboxamide.

7. A compound of the formula

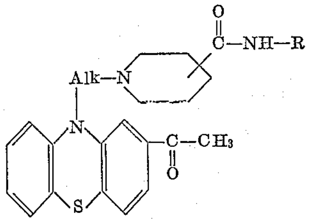

wherein R is lower alkyl and Alk is lower alkylene containing more than 1 carbon atom and separating the nitrogen atoms attached thereto by at least 2 carbon atoms.

8. 1 - [3-(2-acetyl-10-phenothiazinyl)propyl]piperidine-4-(N-methyl)carboxamide.

9. A compound of the formula

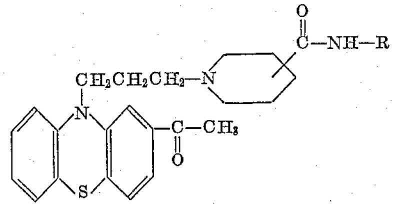

wherein R is hydroxy(lower alkyl).

10. 1-[3-(2-acetyl-10-phenothiazinyl)propyl]piperidine-3-[N-(2-hydroxyethyl)carboxamide].

11. 1 - [3 - (2-butyryl-10-phenothiazinyl)propyl]piperidine-4-(N,N-diethyl)carboxamide.

References Cited in the file of this patent

UNITED STATES PATENTS

| | | |
|---|---|---|
| 2,258,977 | Dickey et al. | Oct. 14, 1941 |
| 2,534,237 | Cusic | Dec. 19, 1950 |
| 2,650,919 | Cusic | Sept. 1, 1953 |
| 2,860,137 | Cusic et al. | Nov. 11, 1958 |
| 2,873,269 | Fasciati et al. | Feb. 10, 1959 |
| 2,892,671 | Alsberg et al. | June 30, 1959 |
| 2,902,485 | Horclois | Sept. 1, 1959 |

FOREIGN PATENTS

| | | |
|---|---|---|
| 293/55 | South Africa | (1955) |
| 560,750 | Belgium | Sept. 12, 1957 |
| 562,299 | Belgium | Nov. 12, 1957 |

OTHER REFERENCES

Delay et al.: Presse Med., vol. 65, pp. 491–3 (March 1957).

Cusic et al.: Abstracts of Papers, 135th American Chemical Society Meeting (April 5 to 10, 1959), pages 26N and 27N (published March 9, 1959).